(12) United States Patent
Sim et al.

(10) Patent No.: US 12,621,118 B2
(45) Date of Patent: May 5, 2026

(54) SELF-INTERFERENCE CANCELLATION FOR FULL-DUPLEX COMMUNICATION

(71) Applicant: QUALCOMM Incorporated, San Diego, CA (US)

(72) Inventors: Min Soo Sim, San Diego, CA (US); Wooseok Nam, San Diego, CA (US); Zhifei Fan, San Diego, CA (US); Shubham Ahuja, San Diego, CA (US); Alexander Dorosenco, El Cajon, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 604 days.

(21) Appl. No.: 18/147,494

(22) Filed: Dec. 28, 2022

(65) Prior Publication Data

US 2023/0336321 A1 Oct. 19, 2023

Related U.S. Application Data

(60) Provisional application No. 63/363,084, filed on Apr. 15, 2022.

(51) Int. Cl.
*H04L 5/14* (2006.01)
*H04L 5/00* (2006.01)

(52) U.S. Cl.
CPC .......... *H04L 5/1461* (2013.01); *H04L 5/0051* (2013.01)

(58) Field of Classification Search
CPC ...... H04L 5/1461; H04L 5/0051; H04B 1/525
See application file for complete search history.

(56) References Cited

U.S. PATENT DOCUMENTS

| | | | | |
|---|---|---|---|---|
| 8,718,178 | B1 * | 5/2014 | Carbone | ............... H03F 1/3241 |
| | | | | 375/296 |
| 9,197,264 | B1 * | 11/2015 | Yoo | ...................... H04B 1/1027 |
| 2014/0301498 | A1 * | 10/2014 | Rimini | ..................... H04B 1/12 |
| | | | | 375/285 |

(Continued)

FOREIGN PATENT DOCUMENTS

| | | | |
|---|---|---|---|
| EP | 3110023 A1 | 12/2016 |
| EP | 3031141 B1 | 2/2018 |

(Continued)

OTHER PUBLICATIONS

C. Cowan and P. Adams, "Non-linear system modelling : Concept and application," ICASSP '84. IEEE International Conference on Acoustics, Speech, and Signal Processing, San Diego, CA, USA, 1984, pp. 444-447. (Year: 1984).*

(Continued)

*Primary Examiner* — Ayaz R Sheikh
*Assistant Examiner* — Tarell A Hampton
(74) *Attorney, Agent, or Firm* — Harrity & Harrity, LLP

(57) ABSTRACT

Various aspects of the present disclosure generally relate to wireless communication. In some aspects, a network node may transmit a first signal in accordance with a full duplex configuration. The network node may receive a second signal comprising a communication and self-interference associated with the first signal, wherein receiving the second signal comprises cancelling the self-interference based at least in part on a nonlinear interference cancellation (NLIC) procedure associated with a subset of kernels of a set of nonlinear candidate kernels corresponding to a nonlinear self-interference model. Numerous other aspects are described.

28 Claims, 7 Drawing Sheets

(56) References Cited

U.S. PATENT DOCUMENTS

| | | | | |
|---|---|---|---|---|
| 2015/0065058 A1* | 3/2015 | Wang | H04B 15/00 | 455/63.1 |
| 2015/0126146 A1* | 5/2015 | Wang | H04B 1/126 | 455/296 |
| 2015/0131757 A1* | 5/2015 | Carbone | H03D 1/04 | 375/296 |
| 2015/0139122 A1* | 5/2015 | Rimini | H04W 72/541 | 370/329 |
| 2016/0071009 A1* | 3/2016 | Abrishamkar | G06N 3/08 | 706/25 |
| 2016/0072590 A1* | 3/2016 | Tu | H04B 1/525 | 455/63.1 |
| 2016/0072591 A1* | 3/2016 | Tu | H04B 1/0475 | 455/63.1 |
| 2016/0072592 A1* | 3/2016 | Tu | H04B 1/406 | 375/219 |
| 2016/0072649 A1* | 3/2016 | Tu | H04B 1/525 | 375/346 |
| 2016/0380653 A1* | 12/2016 | Sheikh | H04B 1/0475 | 370/282 |
| 2017/0353286 A1* | 12/2017 | Nallampattiekambaram | H04L 5/1461 | |
| 2020/0295793 A1* | 9/2020 | Maleki | H04B 1/1027 | |

FOREIGN PATENT DOCUMENTS

| | | |
|---|---|---|
| WO | WO-2013026038 A1 | 2/2013 |
| WO | WO-2015069973 A1 | 5/2015 |

OTHER PUBLICATIONS

N. Muhammad Amin and M. Weber, "Transmit and receive cross-talk cancellation," 2010 6th International Conference on Emerging Technologies (ICET), Islamabad, Pakistan, 2010, pp. 210-215, doi: 10.1109/ICET.2010.5638489. (Year: 2010).*

International Search Report and Written Opinion—PCT/US2023/017161—ISA/EPO—Jul. 7, 2023.

* cited by examiner

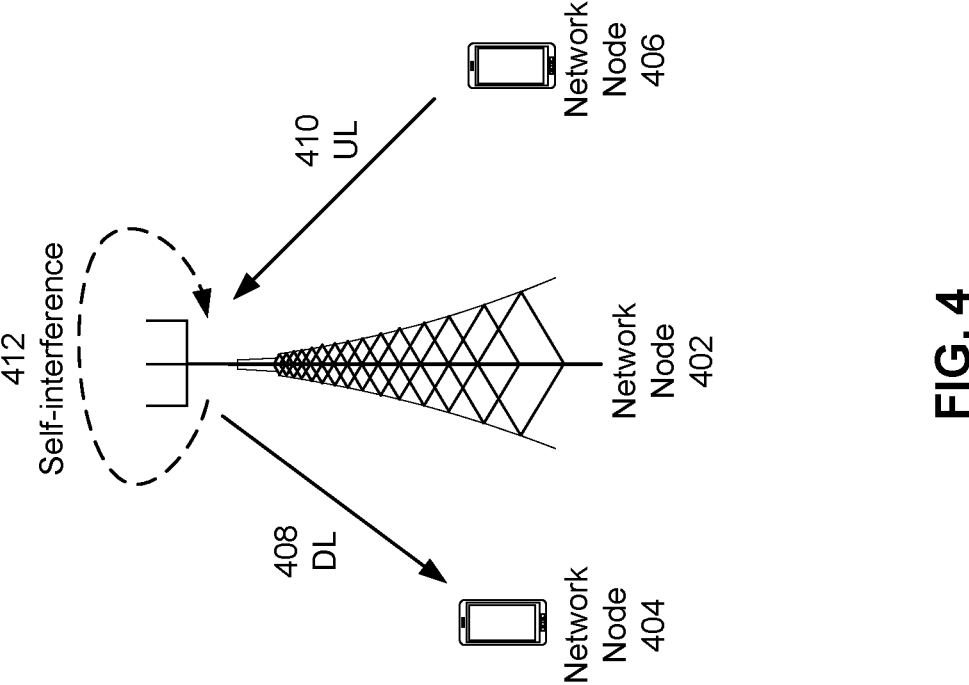
FIG. 4

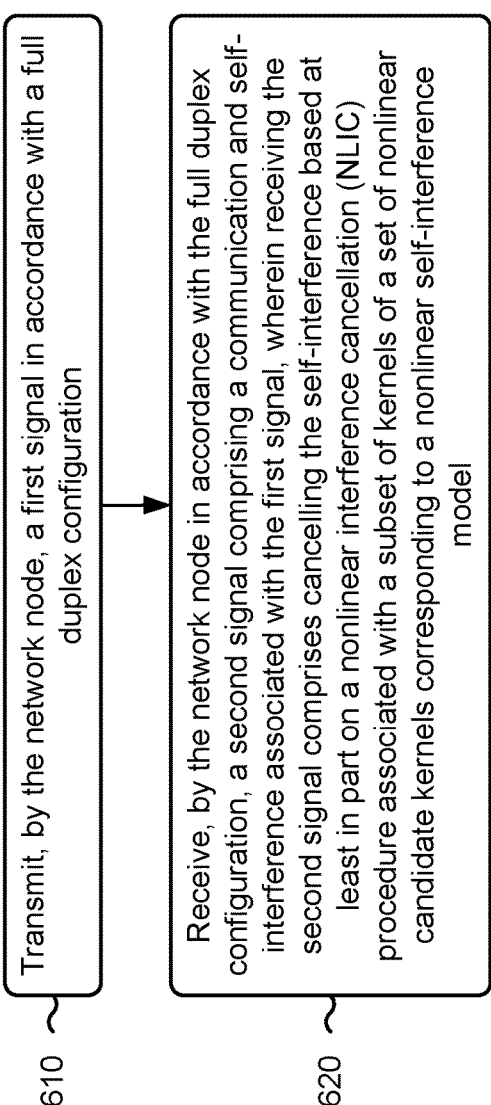

Transmit, by the network node, a first signal in accordance with a full duplex configuration Receive, by the network node in accordance with the full duplex configuration, a second signal comprising a communication and self-interference associated with the first signal, wherein receiving the second signal comprises cancelling the self-interference based at least in part on a nonlinear interference cancellation (NLIC) procedure associated with a subset of kernels of a set of nonlinear candidate kernels corresponding to a nonlinear self-interference model

SELF-INTERFERENCE CANCELLATION FOR FULL-DUPLEX COMMUNICATION

CROSS-REFERENCE TO RELATED APPLICATION

This Patent Application claims priority to U.S. Provisional Patent Application No. 63/363,084, filed on Apr. 15, 2022, entitled "SELF-INTERFERENCE CANCELLATION FOR FULL-DUPLEX COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for self-interference cancellation for full-duplex communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a network node for wireless communication. The network node may include a memory and one or more processors coupled to the memory. The one or more processors may be configured to transmit a first signal in accordance with a full duplex configuration. The one or more processors may be configured to receive a second signal comprising a communication and self-interference associated with the first signal, wherein receiving the second signal comprises cancelling the self-interference based at least in part on a nonlinear interference cancellation (NLIC) procedure associated with a subset of kernels of a set of nonlinear candidate kernels corresponding to a nonlinear self-interference model.

Some aspects described herein relate to a method of wireless communication performed by a network node. The method may include transmitting, by the network node, a first signal in accordance with a full duplex configuration. The method may include receiving, by the network node in accordance with the full duplex configuration, a second signal comprising a communication and self-interference associated with the first signal, wherein receiving the second signal comprises cancelling the self-interference based at least in part on an NLIC procedure associated with a subset of kernels of a set of nonlinear candidate kernels corresponding to a nonlinear self-interference model.

Some aspects described herein relate to a non-transitory computer-readable medium that stores a set of instructions for wireless communication by a network node. The set of instructions, when executed by one or more processors of the network node, may cause the network node to transmit a first signal in accordance with a full duplex configuration. The set of instructions, when executed by one or more processors of the network node, may cause the network node to receive a second signal comprising a communication and self-interference associated with the first signal, wherein receiving the second signal comprises cancelling the self-interference based at least in part on an NLIC procedure associated with a subset of kernels of a set of nonlinear candidate kernels corresponding to a nonlinear self-interference model.

Some aspects described herein relate to an apparatus for wireless communication. The apparatus may include means for transmitting a first signal in accordance with a full duplex configuration. The apparatus may include means for receiving a second signal comprising a communication and self-interference associated with the first signal, wherein receiving the second signal comprises cancelling the self-interference based at least in part on an NLIC procedure associated with a subset of kernels of a set of nonlinear candidate kernels corresponding to a nonlinear self-interference model.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of full-duplex communications and self-interference associated with full-duplex communications, in accordance with the present disclosure.

FIG. 6 is a diagram illustrating an example process associated with self-interference cancellation for full-duplex communication, in accordance with the present disclosure.

DETAILED DESCRIPTION

Figure 1:
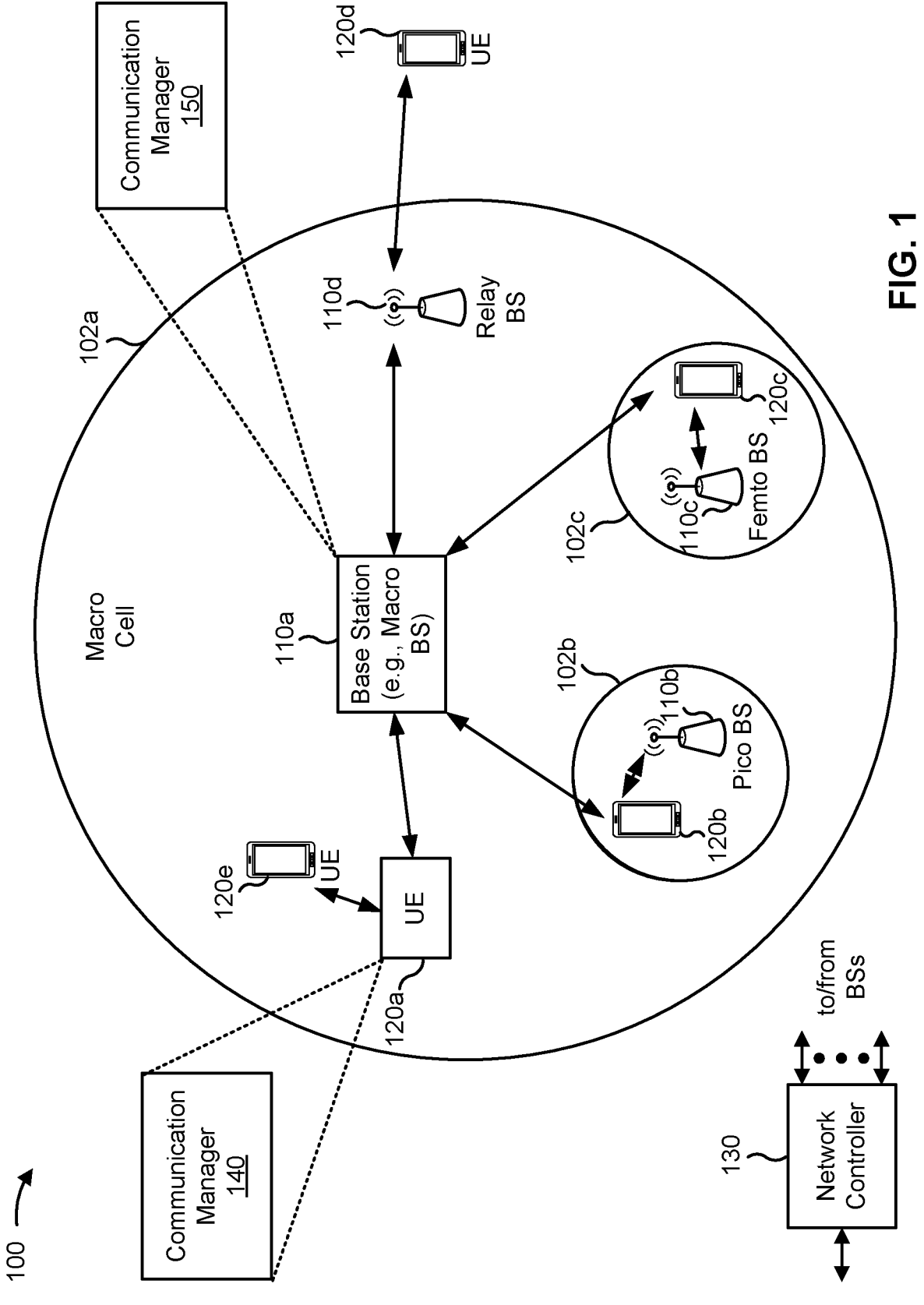
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node may include a communication manager 140 or a communication manager 150. As described in more detail elsewhere herein, the communication manager 140 or 150 may transmit a first signal in accordance with a full duplex configuration; and receive a second signal comprising a communication and self-interference associated with the first signal, wherein receiving the second signal comprises cancelling the self-interference based at least in part on a nonlinear interference cancellation (NLIC) procedure associated with a subset of kernels of a set of nonlinear candidate kernels corresponding to a nonlinear self-interference model. Additionally, or alternatively, the communication manager 140 or 150 may perform one or more other operations described herein.

As indicated above, FIG. 1 is provided as an example. Other examples may differ from what is described with regard to FIG. 1.

Figure 2:
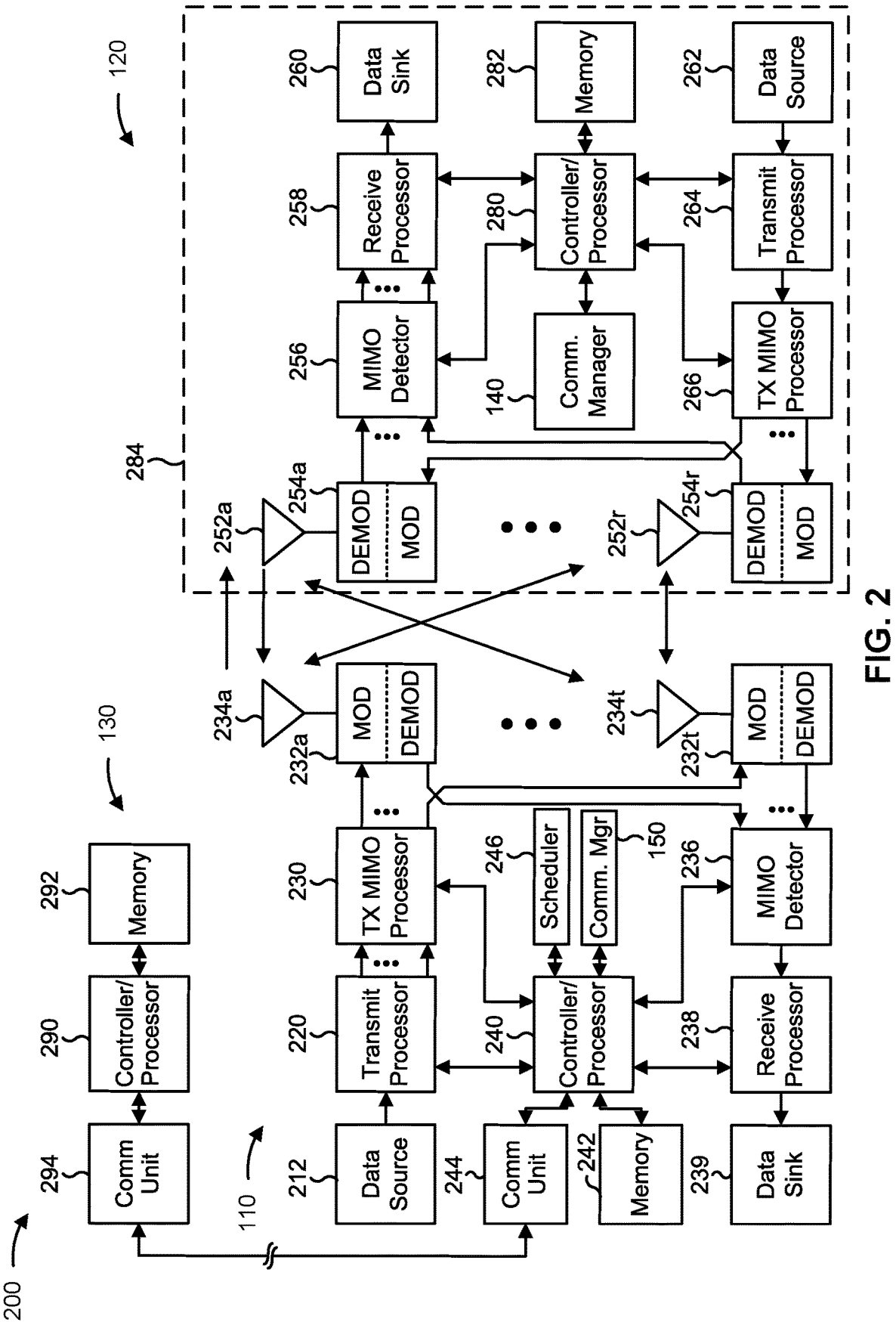
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a centralized unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

For example, the controller/processor 240 of the base station 110, the controller/processor 280 of the UE 120, and/or any other component(s) of FIG. 2 may perform one or more techniques associated with self-interference cancellation for full-duplex communication, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the network node includes means for transmitting, by the network node, a first signal in accordance with a full duplex configuration; and/or means for receiving, by the network node in accordance with the full duplex configuration, a second signal comprising a communication and self-interference associated with the first signal, wherein receiving the second signal comprises cancelling the self-interference based at least in part on an NLIC procedure associated with a subset of kernels of a set of nonlinear candidate kernels corresponding to a nonlinear self-interference model. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
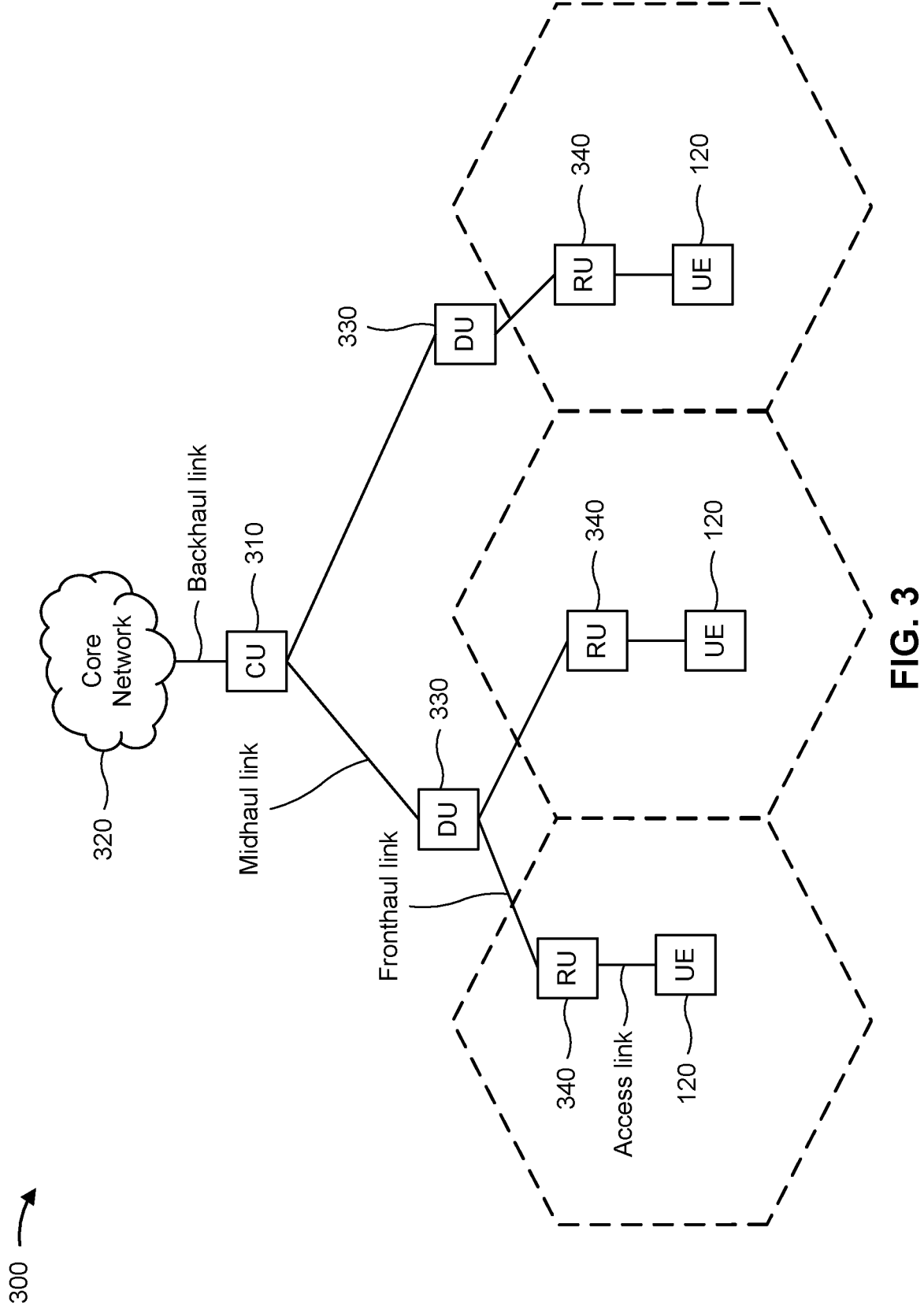
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a CU 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via RF access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

FIG. 4 is a diagram illustrating an example 400 of full-duplex communications and self-interference associated with full-duplex communications, in accordance with the present disclosure. As shown, example 400 includes a network node 402, a network node 404, and a network node 406. In some aspects, the network node 402 may be capable of full-duplex communication. Full-duplex communication may include a contemporaneous uplink and downlink communication using the same resources. In some aspects, the uplink and downlink communications may use a same frequency and/or overlapping frequency. In some aspects, the network node 402 may transmit in one sub-band and receive in another sub-band. As shown, for example, the network node 402 may perform a downlink (DL) transmission 408 to the network node 404 and may receive an uplink (UL) transmission 410 from the network node 406 using the same and/or overlapping frequency resources and/or the same and/or overlapping time resources.

As shown by reference number 412, the DL transmission 408 from the network node 402 may self-interfere with the UL transmission 410 to the network node 402. This may be caused by a variety of factors, such as the higher transmit power for the DL transmission 408 (as compared to the UL transmission) and/or radio frequency bleeding. For example, the self-interference may include direct interference from a transmission chain to a reception chain through an internal coupling path. In some aspects, self-interference may result from radio clutter, which may include over-the-air interference caused by objects surrounding the network node 402.

To mitigate the effects of self-interference, the network node 402 can implement a self-interference cancellation (SIC) procedure. After analog SIC (either passive or active), whose goal is not only suppressing self-interference, but also preventing an analog-to-digital converter (ADC) from becoming saturated, digital SIC can be used to cancel out the self-interference to the level of thermal noise. In some cases, digital SIC can include three aspects: 1) determining a self-interference model, 2) estimating the self-interference, and 3) reconstructing the self-interference and subtracting the reconstructed self-interference from a received signal.

In millimeter wave (mmW) systems, the impact of distortions such as power amplifier (PA) nonlinearity and phase noise can be significant. Accordingly, NLIC can be implemented to facilitate the SIC. In some aspects, for example, nonlinear SIC modeling can be performed using a nonlinear model such as the Volterra-series model and/or the parallel Hammerstein (PH) model, among other examples. Nonlinear models used for determining self-interference can include a large number (e.g., hundreds) of coefficients. In some cases, to implement a nonlinear model, the network node 402 can estimate the coefficients, resulting in a high degree of computational complexity.

Some aspects of the techniques and apparatuses described herein may provide for SIC for full-duplex communications by reducing the number of coefficients to be estimated. For example, nonlinear models include a number of nonlinear kernels, and the number of coefficients may be the same as the number of nonlinear kernels. In some aspects, a network node (e.g., the network node 402) may select a subset of the nonlinear kernels to be used for SIC and may estimate a number of coefficients corresponding to the subset of nonlinear kernels. In this way, some aspects may facilitate performing SIC using a smaller number of coefficients, thereby reducing the computational complexity of the SIC procedure. As a result, some aspects may positively impact network node performance.

As indicated above, FIG. 4 is provided as an example. Other examples may differ from what is described with respect to FIG. 4.

Figure 5:
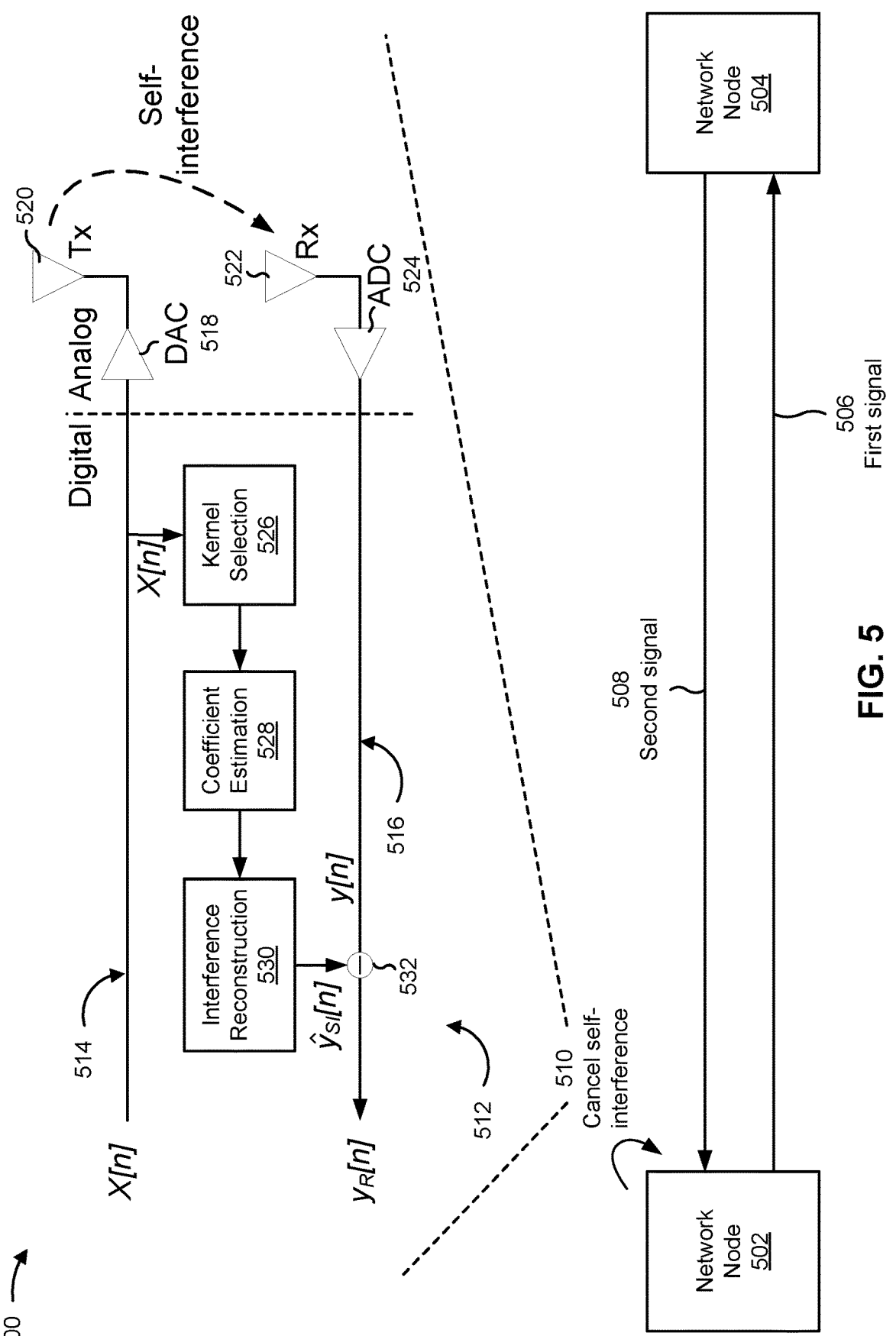
FIG. 5 is a diagram illustrating an example associated with self-interference cancellation for full-duplex communication, in accordance with the present disclosure.

FIG. 5 is a diagram illustrating an example 500 of self-interference cancellation for full-duplex communication, in accordance with the present disclosure. As shown in FIG. 5, a network node 502 and a network node 504 may communicate with one another. In some aspects, the network node 502 may be similar to the network node 402 depicted in FIG. 4. In some aspects, for example, the network node 502 may be, be similar to, include, or be included in a base station. In some aspects, the network node 504 may be similar to the network node 404 and/or the network node 406 depicted in FIG. 4. In some aspects, for example, the network node 504 may include a UE.

As shown by reference number 506, the network node 502 may transmit, and the network node 504 may receive, a first signal. In some aspects, for example, the network node 502 may transmit the first signal in accordance with a full duplex configuration. As shown by reference number 508, the network node 502 may receive a second signal. The second signal may be transmitted by the network node 504, as shown, and/or by another network node (not shown). The network node 502 may receive the second signal in accordance with the full duplex configuration.

In some aspects, the second signal may include a communication and self-interference associated with the first signal. The phrase "receive the second signal" may refer to obtaining the second signal via one or more antenna elements, demodulating the second signal, decoding the second signal, converting the second signal from an analog domain to a digital domain, and/or determining a content of a communication included in the second signal, among other examples. As shown by reference number 510, for example, the network node 502, to receive the second signal, may cancel the self-interference. In some aspects, for example, the network node 502 may cancel the self-interference based at least in part on an NLIC procedure associated with a subset of kernels of a set of nonlinear candidate kernels corresponding to a nonlinear self-interference model.

As shown by the schematic diagram 512 in FIG. 5, the network node 502 may include a transmission (Tx) chain 514 and a reception (Rx) chain 516. The Tx chain 514 may be configured to transmit a signal, x[n], and the Rx chain 516 may be configured to receive a signal, y[n]. In some aspects, for example, the Tx chain 514 may include a digital-to-analog converter (DAC) 518 that converts the signal x[n] from the digital domain to the analog domain. In the analog domain, the Tx chain 514 may include an antenna 520 that transmits the converted signal x[n]. As shown, the Rx chain 516 may include an antenna 522 configured to receive the signal y[n] and an ADC 524 configured to convert the received signal from the analog domain to the digital domain. The received signal y[n] may include a communication and self-interference. The self-interference may be associated with the transmitted signal x[n]. The network node 502 may be configured to cancel the self-interference based at least in part on an NLIC. In some aspects, the NLIC may include, for example, a polynomial self-interference model, a Volterra-series model and/or a PH model.

In some aspects, for example, according to the polynomial self-interference model:

$$y[n] = \sum_{h,p,\ell} c_{h,p,\ell} \psi_{h,p,\ell}(x[n]),$$

where $\psi_{h,p,\ell}(x[n])$ are polynomial kernels expressed as $\psi_{h,p,\ell}(x[n]) = x[n-\ell]^h |x[n-\ell]|^p$ with parameters $h$, $p$, $\ell$, where x[n] is Tx signal, y[n] is Rx residual self-interference after isolation and/or analog SIC, and $\hat{y}_{SI}$ is the reconstructed self-interference. In some aspects, according to the Volterra-series model:

$$y[n] = \sum_{\substack{p=1 \\ p \text{ odd}}}^{P} \sum_{m_1=-M_{1,p}}^{M_{2,p}} \sum_{m_2=m_1}^{M_{2,p}} \cdots$$

$$\sum_{m_{(p+1)/2}=m_{(p-1)/2}}^{M_{2,p}} \sum_{m_{(p+3)/2}=-M_{1,p}}^{M_{2,p}} \cdots \sum_{m_p=m_{p-1}}^{M_{2,p}} \gamma_{p,m_1,\ldots,m_p} \phi_{p,m_1,\ldots,m_p}[n]$$

and $$\phi_{p,m_1,\ldots,m_p}[n] = \prod_{j=1}^{(p+1)/2} x[n-Lm_j] \prod_{k=(p+3)/2}^{p} x^*[n-Lm_k],$$

where x[n] is an oversampled Tx signal, y[n] is an Rx residual self-interference after isolation and/or analog SIC, L is the decimation factor, $\phi_{p,m_1,\ldots,m_g}[n]$ is the basis function of the Volterra series, $\gamma_{p,m_1,\ldots,m_p}$ is corresponding coefficient, P is the nonlinearity order, $M_{1,p}$ is the number of pre-cursor memory taps for the p-th order terms, and $M_{1,p}$ is the number of post-cursor memory taps for the p-th order terms.

In some aspects, according to the PH model:

$$y[n] = \sum_{k=0}^{K-1} \sum_{\ell=0}^{L-1} b_{2k+1,\ell} |x[n-\ell]|^{2k} x[n-\ell],$$

where x[n] is Tx signal, y[n] is Rx residual self-interference after isolation and/or analog SIC, $b_{2k+1,\ell}$ is a coefficient, K is the number of odd order and L is the number of taps.

As shown, for example, the network node 502 may include a kernel selection component 526, a coefficient estimation component 528, and an interference reconstruction component 530. In some aspects, the kernel selection component 526, the coefficient estimation component 528, and/or the interference reconstruction component 530 may include hardware and/or software. The network node 502 may, by the kernel selection component 526, generate a subset of kernels based at least in part on performing a kernel selection procedure. The network node 502 may, by the coefficient estimation component 528, estimate a set of coefficients based at least in part on performing a coefficient estimation procedure. In some aspects, a quantity of coefficients in the set of coefficients may be based at least in part on a quantity of selected kernels in the subset of kernels. The network node 502 may, by the interference reconstruction component 530, generate a self-interference reconstruction, $\hat{y}_{SI}[n]$, based at least in part on the set of coefficients. As shown by reference number 532, the network node 502 may cancel the self-interference from the received signal y[n] by subtracting the self-interference reconstruction $\hat{y}_{SI}[n]$ from the received signal y[n].

In some aspects, the network node 502 may perform the kernel selection procedure and/or the coefficient estimation procedure periodically, semi-persistently, and/or aperiodically. In some aspects, the network node 502 may perform the kernel selection procedure concurrently with performing the coefficient estimation procedure. In some other aspects, the network node 502 may perform the kernel selection procedure during a first time period and may perform the coefficient estimation procedure during a second time period that is different from the first time period. In some aspects, the network node 502 may perform the kernel selection procedure and/or the coefficient estimation procedure based at least in part on a set of SIC resources.

For example, the network node 502 may configure (or be configured with) one or more time and/or frequency resources during which the network node 502 may transmit a reference signal (e.g., the signal x[n]) to be used to determine the self-interference to be cancelled. In some aspects, for example, the set of SIC resources may correspond to a transmission pause associated with at least one other network node (e.g., the network node 504). The network node 502 may estimate the set of coefficients based at least in part on the self-interference reference signal. In some aspects, the network node 502 may perform the coefficient estimation procedure based at least in part on performing at least one of a least square procedure or a recursive least square procedure. In some aspects, the network node 502 may configure one or more parameters to facilitate reducing computational complexity associated with the SIC procedure. For example, the one or more parameters may include the set of nonlinear candidate kernels, a quantity of kernels in the subset of kernels, and/or a length of the reference signal.

In an example of the kernel selection process, for example, the kernel candidates may be:

$$x[n-m]^h |x[n-m]|^p,$$

where $m \in [-20,20]$, $h \in [1,3]$, and $p \in [0,6]$. The interference cancellation may yield:

$$\hat{y}_{SI}[n] =_{(m,h,p)} c_{m,h,p} x[n-m]^h |x[n-m]|^p.$$

In some aspects, the kernel selection process may be performed iteratively. For example, after selecting n−1 kernels, the network node 502 may orthonormalize each remaining kernel candidate to the selected kernels. For example, the network node 502 may select the n-th kernels associated with the maximum correlation with the received signal. In some aspects, for example, the kernels may be defined as $\psi_{h,p,\ell}$ (x[n]). Any number of other kernel models may be used in accordance with the present disclosure.

As an example, the network node 502 may generate a set $K_0$ of all possible kernel candidates using (h, p, l), where h, p, and l are parameters used in the kernel selection process. For example, a total of 861 kernel candidates may be generated: $K_0 = \{(h, p, l) | 1 \le h \le 3, 0 \le p \le 6, -21 \le l \le 21\}$. For $1 \le n \le N$=the number of kernels to be selected−(e.g., in this example, the network node 502 may select 11 kernels), and for kernel index c in all kernel candidates left in $K_{n-1}$−(here the size of $K_{n-1}$ is 861−(n−1)), the network node 502 may create the kernel vector for the c-th kernel using input signal $x_{in}$:

$$s_c = \psi_{h_c,p_c,l_c}(x_{in}[n]) = x_{in}[n-l_c]^{h_c} |x_{in}[n-l_c]|^{p_c}.$$

The network node 502 may then orthonormalize the kernel vector $s_c$ with all orthonormalized kernel vectors $\overline{S}_{ortho[1:n-1]}$ of previously selected n−1 kernels:

$$s_{ortho,c} = s_c - \overline{S}_{ortho[1:n-1]}\left(\left(\overline{S}_{ortho[1:n-1]}\right)^H s_c\right)$$

$$\overline{s}_{ortho,c} = \frac{s_{ortho,c}}{\|s_{ortho,c}\|}.$$

The network node 502 may correlate $s_{ortho,c}$ with the received signal y:

$$\text{Corr}_c = (\overline{s}_{ortho,c})^H y,$$

and select the c*-th kernel candidate that provides max correlation:

$$c^* = \text{argmax}(\text{abs}(\text{Corr}_c)).$$

The network node 502 may Update $\overline{S}_{ortho[1:n]}$:

$$\overline{S}_{ortho[1:n]} = [\overline{S}_{ortho[1:n-1]}, \overline{s}_{ortho,c^*}]$$

and remove the c*-th kernel candidate from kernel candidates: $K_n = K_{n-1} \setminus \{c^*\}$. This process may be iterated until all (e.g., 11) kernels have been selected.

As indicated above, FIG. 5 is provided as an example. Other examples may differ from what is described with respect to FIG. 5.

FIG. 6 is a diagram illustrating an example process 600 performed, for example, by a network node, in accordance with the present disclosure. Example process 600 is an example where the network node (e.g., network node 502) performs operations associated with self-interference cancellation for full-duplex communication.

As shown in FIG. 6, in some aspects, process 600 may include transmitting a first signal in accordance with a full duplex configuration (block 610). For example, the network node (e.g., using communication manager 708 and/or transmission component 704, depicted in FIG. 7) may transmit a first signal in accordance with a full duplex configuration, as described above.

As further shown in FIG. 6, in some aspects, process 600 may include receiving a second signal comprising a communication and self-interference associated with the first signal, wherein receiving the second signal comprises cancelling the self-interference based at least in part on an NLIC procedure associated with a subset of kernels of a set of nonlinear candidate kernels corresponding to a nonlinear self-interference model (block 620). For example, the network node (e.g., using communication manager 708 and/or reception component 702, depicted in FIG. 7) may receive a second signal comprising a communication and self-interference associated with the first signal, wherein receiving the second signal comprises cancelling the self-interference based at least in part on an NLIC procedure associated with a subset of kernels of a set of nonlinear candidate kernels corresponding to a nonlinear self-interference model, as described above.

Process 600 may include additional aspects, such as any single aspect or any combination of aspects described below and/or in connection with one or more other processes described elsewhere herein.

In a first aspect, process 600 includes performing the NLIC procedure. In a second aspect, alone or in combination with the first aspect, performing the NLIC procedure comprises generating the subset of kernels based at least in part on performing a kernel selection procedure, estimating a set of coefficients based at least in part on performing a coefficient estimation procedure, wherein a quantity of coefficients in the set of coefficients is based at least in part on a quantity of selected kernels in the subset of kernels, and generating a self-interference reconstruction based at least in part on the set of coefficients, wherein cancelling the self-interference comprises subtracting the self-interference reconstruction from the second signal. In a third aspect, alone or in combination with the second aspect, performing the kernel selection procedure comprises performing the kernel selection procedure periodically, semi-persistently, or aperiodically. In a fourth aspect, alone or in combination with one or more of the second or third aspects, performing the coefficient estimation procedure comprises performing the coefficient estimation procedure periodically, semi-persistently, or aperiodically.

In a fifth aspect, alone or in combination with one or more of the second through fourth aspects, performing the kernel selection procedure comprises performing the kernel selection procedure concurrently with performing the coefficient estimation procedure. In a sixth aspect, alone or in combination with one or more of the second through fifth aspects, performing the kernel selection procedure comprises performing the kernel selection procedure during a first time period, and wherein performing the coefficient estimation procedure comprises performing the coefficient estimation procedure during a second time period that is different from the first time period.

In a seventh aspect, alone or in combination with one or more of the second through sixth aspects, performing at least one of the kernel selection procedure or the coefficient estimation procedure comprises performing the at least one of the kernel selection procedure or the coefficient estimation procedure based at least in part on a set of SIC resources. In an eighth aspect, alone or in combination with one or more of the second through seventh aspects, performing the kernel selection procedure comprises generating the set of nonlinear kernel candidates, selecting a first kernel of the set of nonlinear candidate kernels based at least in part on a first kernel vector associated with the first kernel corresponding to a first maximum correlation with the second signal, wherein the first maximum correlation comprises a greatest correlation value from a set of correlation values corresponding to the set of candidate kernels, generating a second kernel vector corresponding to a second kernel of the set of nonlinear candidate kernels, generating an orthonormalized kernel vector by orthonormalizing the second kernel vector with the first kernel vector, and selecting the second kernel based at least in part on the orthonormalized kernel vector corresponding to a second maximum correlation with the second signal, wherein the second maximum correlation comprises a greatest correlation value from a subset of candidate kernels of the set of candidate kernels, wherein the subset of candidate kernels excludes the first kernel. In a ninth aspect, alone or in combination with one or more of the second through eighth aspects, process 600 includes performing, based at least in part on a set of SIC resources, at least one of an updated kernel selection procedure or an updated coefficient estimation procedure. In a tenth aspect, alone or in combination with the ninth aspect, the set of SIC resources corresponds to a transmission pause associated with at least one other network node.

In an eleventh aspect, alone or in combination with one or more of the second through tenth aspects, performing the coefficient estimation procedure comprises transmitting a self-interference reference signal, wherein estimating the set of coefficients comprises estimating the set of coefficients based at least in part on the self-interference reference signal. In a twelfth aspect, alone or in combination with one or more of the second through eleventh aspects, performing the coefficient estimation procedure comprises performing at least one of a least square procedure or a recursive least square procedure. In a thirteenth aspect, alone or in combination with one or more of the second through twelfth aspects, process 600 includes configuring at least one of the set of nonlinear candidate kernels, a quantity of kernels in the subset of kernels, or a length of a reference signal.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
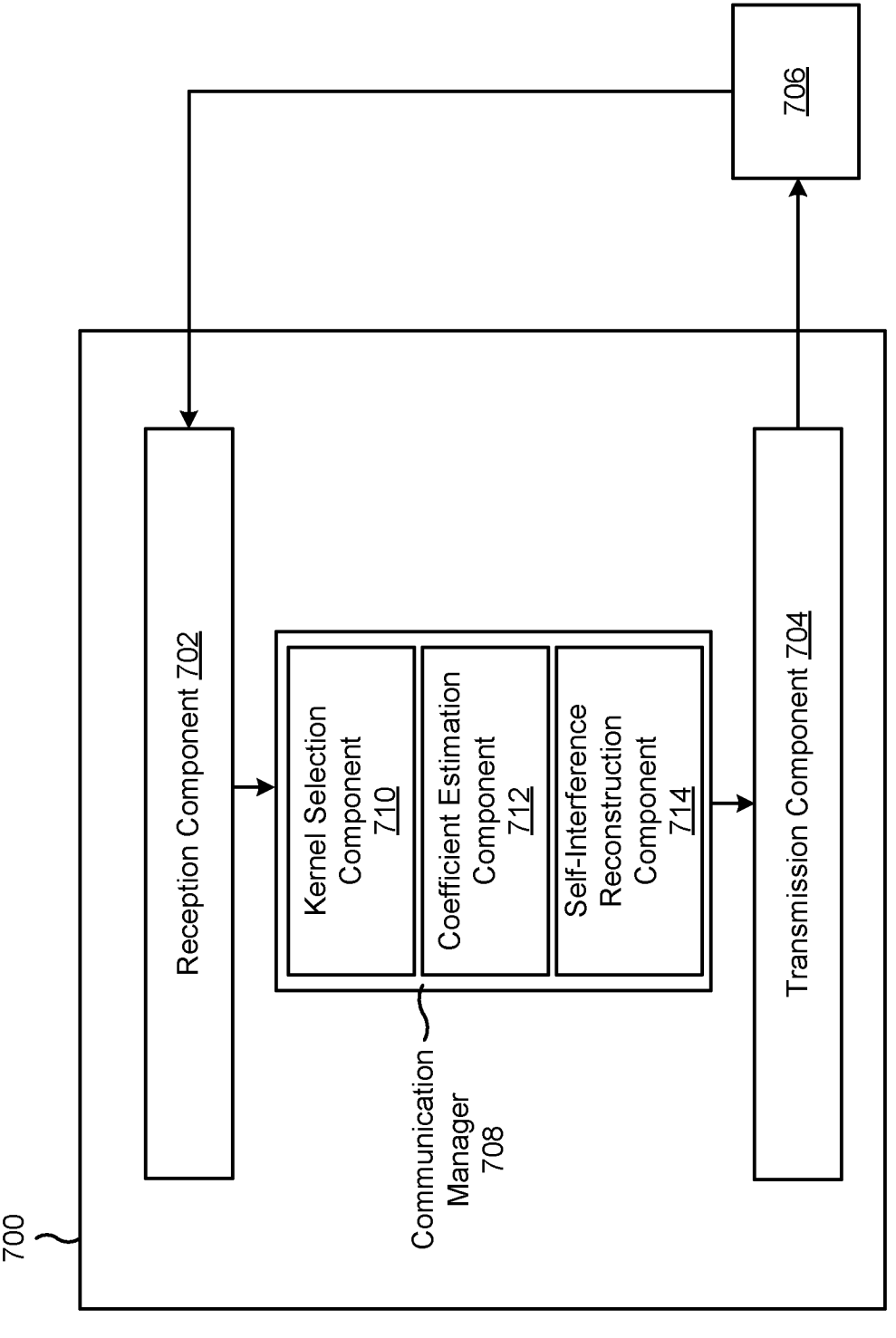
FIG. 7 is a diagram of an example apparatus for wireless communication, in accordance with the present disclosure.

FIG. 7 is a diagram of an example apparatus 700 for wireless communication. The apparatus 700 may be a network node, or a network node may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 708. The communication manager 708 may include one or more of a kernel selection component 710, a coefficient estimation component 712, or a self-interference reconstruction component 714, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE and/or the base station described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE and/or the base station described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE and/or the base station described in connection with FIG. 2. In some aspects, the transmission component 704 may be co-located with the reception component 702 in a transceiver.

The transmission component 704 may transmit a first signal in accordance with a full duplex configuration. The reception component 702 may receive a second signal comprising a communication and self-interference associated with the first signal, wherein receiving the second signal comprises cancelling the self-interference based at least in part on an NLIC procedure associated with a subset of kernels of a set of nonlinear candidate kernels corresponding to a nonlinear self-interference model.

The communication manager 708, the kernel selection component 710, the coefficient estimation component 712, and/or the self-interference reconstruction component 714 may perform the NLIC procedure. In some aspects, the communication manager 708 may include one or more antennas, a modem, a controller/processor, a memory, or a combination thereof, of the UE and/or the base station described in connection with FIG. 2. In some aspects, for example, the communication manager 708 may be, be similar to, include, or be included in, the communication manager 140 and/or the communication manager 150 depicted in FIGS. 1 and 2. In some aspects, the communication manager 708 may include the reception component 702 and/or the transmission component 704.

In some aspects, the kernel selection component 710 may include one or more antennas, a modem, a controller/processor, a memory, or a combination thereof, of the UE and/or the base station described in connection with FIG. 2. In some aspects, the kernel selection component 710 may include the reception component 702 and/or the transmission component 704. In some aspects, the coefficient estimation component 712 may include one or more antennas, a modem, a controller/processor, a memory, or a combination thereof, of the UE and/or the base station described in connection with FIG. 2. In some aspects, the coefficient estimation component 712 may include the reception component 702 and/or the transmission component 704. In some aspects, the self-interference reconstruction component 714 may include one or more antennas, a modem, a controller/processor, a memory, or a combination thereof, of the UE and/or the base station described in connection with FIG. 2. In some aspects, the self-interference reconstruction component 714 may include the reception component 702 and/or the transmission component 704.

The communication manager 708, the kernel selection component 710, and/or the coefficient estimation component 712 may perform, based at least in part on a set of SIC resources, at least one of an updated kernel selection procedure or an updated coefficient estimation procedure. The kernel selection component 710 may configure at least one of the set of nonlinear candidate kernels, a quantity of kernels in the subset of kernels, or a length of a reference signal.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a network node, comprising: transmitting, by the network node, a first signal in accordance with a full duplex configuration; and receiving, by the network node in accordance with the full duplex configuration, a second signal comprising a communication and self-interference associated with the first signal, wherein receiving the second signal comprises cancelling the self-interference based at least in part on a nonlinear interference cancellation (NLIC) procedure associated with a subset of kernels of a set of nonlinear candidate kernels corresponding to a nonlinear self-interference model.

Aspect 2: The method of Aspect 1, further comprising performing the NLIC procedure.

Aspect 3: The method of Aspect 2, wherein performing the NLIC procedure comprises: generating the subset of kernels based at least in part on performing a kernel selection procedure; estimating a set of coefficients based at least in part on performing a coefficient estimation procedure, wherein a quantity of coefficients in the set of coefficients is based at least in part on a quantity of selected kernels in the subset of kernels; and generating a self-interference reconstruction based at least in part on the set of coefficients, wherein cancelling the self-interference comprises subtracting the self-interference reconstruction from the second signal.

Aspect 4: The method of Aspect 3, wherein performing the kernel selection procedure comprises performing the kernel selection procedure periodically, semi-persistently, or aperiodically.

Aspect 5: The method of either of Aspects 3 or 4, wherein performing the coefficient estimation procedure comprises performing the coefficient estimation procedure periodically, semi-persistently, or aperiodically.

Aspect 6: The method of any of Aspect 3-5, wherein performing the kernel selection procedure comprises performing the kernel selection procedure concurrently with performing the coefficient estimation procedure.

Aspect 7: The method of any of Aspect 3-6, wherein performing the kernel selection procedure comprises performing the kernel selection procedure during a first time period, and wherein performing the coefficient estimation procedure comprises performing the coefficient estimation procedure during a second time period that is different from the first time period.

Aspect 8: The method of any of Aspect 3-7, wherein performing at least one of the kernel selection procedure or the coefficient estimation procedure comprises performing the at least one of the kernel selection procedure or the coefficient estimation procedure based at least in part on a set of self-interference cancellation (SIC) resources.

Aspect 9: The method of any of Aspect 3-8, wherein performing the kernel selection procedure comprises: generating the set of nonlinear kernel candidates; selecting a first kernel of the set of nonlinear candidate kernels based at least in part on a first kernel vector associated with the first kernel corresponding to a first maximum correlation with the second signal, wherein the first maximum correlation comprises a greatest correlation value from a set of correlation values corresponding to the set of candidate kernels; generating a second kernel vector corresponding to a second kernel of the set of nonlinear candidate kernels; generating an orthonormalized kernel vector by orthonormalizing the second kernel vector with the first kernel vector; and selecting the second kernel based at least in part on the orthonormalized kernel vector corresponding to a second maximum correlation with the second signal, wherein the second maximum correlation comprises a greatest correlation value from a subset of candidate kernels of the set of candidate kernels, wherein the subset of candidate kernels excludes the first kernel.

Aspect 10: The method of any of Aspect 3-9, further comprising performing, based at least in part on a set of self-interference cancellation (SIC) resources, at least one of an updated kernel selection procedure or an updated coefficient estimation procedure.

Aspect 11: The method of Aspect 10, wherein the set of SIC resources corresponds to a transmission pause associated with at least one other network node.

Aspect 12: The method of any of Aspect 3-11, wherein performing the coefficient estimation procedure comprises transmitting a self-interference reference signal, wherein estimating the set of coefficients comprises estimating the set of coefficients based at least in part on the self-interference reference signal.

Aspect 13: The method of any of Aspect 3-12, wherein performing the coefficient estimation procedure comprises performing at least one of a least square procedure or a recursive least square procedure.

Aspect 14: The method of any of Aspect 1-13, further comprising configuring at least one of the set of nonlinear candidate kernels, a quantity of kernels in the subset of kernels, or a length of a reference signal.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
    one or more memories; and
    one or more processors, based at least in part on information stored in the one or more memories, configured to:
        transmit a first signal in accordance with a full duplex configuration;
        generate a subset of kernels, of a set of nonlinear candidate kernels corresponding to a nonlinear self-interference model, based at least in part on performing a kernel selection procedure;
        estimate a set of coefficients based at least in part on performing a coefficient estimation procedure, wherein a quantity of coefficients in the set of coefficients is based at least in part on a quantity of selected kernels in the subset of kernels; and
        receive a second signal comprising a communication and self-interference associated with the first signal, wherein receiving the second signal comprises cancelling the self-interference based at least in part on a nonlinear interference cancellation (NLIC) procedure associated with the subset of kernels.

2. The network node of claim 1,
wherein the one or more processors are further configured to perform the NLIC procedure.

3. The network node of claim 2,
wherein the one or more processors, to perform the NLIC procedure, are configured to:

generate a self-interference reconstruction based at least in part on the set of coefficients, wherein cancelling the self-interference comprises subtracting the self-interference reconstruction from the second signal.

4. The network node of claim 1,
wherein the one or more processors, to perform the kernel selection procedure, are configured to perform the kernel selection procedure periodically, semi-persistently, or aperiodically.

5. The network node of claim 1,
wherein the one or more processors, to perform the coefficient estimation procedure, are configured to perform the coefficient estimation procedure periodically, semi-persistently, or aperiodically.

6. The network node of claim 1,
wherein the one or more processors, to perform the kernel selection procedure, are configured to perform the kernel selection procedure concurrently with performing the coefficient estimation procedure.

7. The network node of claim 1,
wherein the one or more processors, to perform the kernel selection procedure, are configured to perform the kernel selection procedure during a first time period, and wherein the one or more processors, to perform the coefficient estimation procedure, are configured to perform the coefficient estimation procedure during a second time period that is different from the first time period.

8. The network node of claim 1,
wherein the one or more processors, to perform at least one of the kernel selection procedure or the coefficient estimation procedure, are configured to perform the at least one of the kernel selection procedure or the coefficient estimation procedure based at least in part on a set of self-interference cancellation (SIC) resources.

9. The network node of claim 1,
wherein the one or more processors, to perform the kernel selection procedure, are configured to:
    generate the set of nonlinear kernel candidates;
    select a first kernel of the set of nonlinear candidate kernels based at least in part on a first kernel vector associated with the first kernel corresponding to a first maximum correlation with the second signal, wherein the first maximum correlation comprises a greatest correlation value from a set of correlation values corresponding to the set of candidate kernels;
    generate a second kernel vector corresponding to a second kernel of the set of nonlinear candidate kernels;
    generate an orthonormalized kernel vector by orthonormalizing the second kernel vector with the first kernel vector; and
    select the second kernel based at least in part on the orthonormalized kernel vector corresponding to a second maximum correlation with the second signal, wherein the second maximum correlation comprises a greatest correlation value from a subset of candidate kernels of the set of candidate kernels, wherein the subset of candidate kernels excludes the first kernel.

10. The network node of claim 1,
wherein the one or more processors are further configured to perform, based at least in part on a set of self-interference cancellation (SIC) resources, at least one of an updated kernel selection procedure or an updated coefficient estimation procedure.

11. The network node of claim 10,
wherein the set of SIC resources corresponds to a transmission pause associated with at least one other network node.

12. The network node of claim 1,
wherein the one or more processors, to perform the coefficient estimation procedure, are configured to transmit a self-interference reference signal, and wherein the one or more processors, to estimate the set of coefficients, are configured to estimate the set of coefficients based at least in part on the self-interference reference signal.

13. The network node of claim 1,
wherein the one or more processors, to perform the coefficient estimation procedure, are configured to perform at least one of a least square procedure or a recursive least square procedure.

14. The network node of claim 1,
wherein the one or more processors are further configured to generate at least one of the set of nonlinear candidate kernels, a quantity of kernels in the subset of kernels, or a length of a reference signal.

15. A method of wireless communication performed by a network node, comprising:
transmitting, by the network node, a first signal in accordance with a full duplex configuration;
generating a subset of kernels, of a set of nonlinear candidate kernels corresponding to a nonlinear self-interference model, based at least in part on performing a kernel selection procedure;
estimating a set of coefficients based at least in part on performing a coefficient estimation procedure, wherein a quantity of coefficients in the set of coefficients is based at least in part on a quantity of selected kernels in the subset of kernels; and
receiving, by the network node in accordance with the full duplex configuration, a second signal comprising a communication and self-interference associated with the first signal, wherein receiving the second signal comprises cancelling the self-interference based at least in part on a nonlinear interference cancellation (NLIC) procedure associated with a subset of kernels of a set of nonlinear candidate kernels corresponding to a nonlinear self-interference model.

16. The method of claim 15, further comprising performing the NLIC procedure.

17. The method of claim 16,
wherein performing the NLIC procedure comprises:
generating a self-interference reconstruction based at least in part on the set of coefficients, wherein cancelling the self-interference comprises subtracting the self-interference reconstruction from the second signal.

18. The method of claim 15,
wherein performing the kernel selection procedure comprises performing the kernel selection procedure periodically, semi-persistently, or aperiodically.

19. The method of claim 15,
wherein performing the coefficient estimation procedure comprises performing the coefficient estimation procedure periodically, semi-persistently, or aperiodically.

20. The method of claim 15,
wherein performing the kernel selection procedure comprises performing the kernel selection procedure concurrently with performing the coefficient estimation procedure.

21. The method of claim 15,
wherein performing the kernel selection procedure comprises performing the kernel selection procedure during a first time period, and wherein performing the coefficient estimation procedure comprises performing the coefficient estimation procedure during a second time period that is different from the first time period.

22. The method of claim 15,
wherein performing at least one of the kernel selection procedure or the coefficient estimation procedure comprises performing the at least one of the kernel selection procedure or the coefficient estimation procedure based at least in part on a set of self-interference cancellation (SIC) resources.

23. The method of claim 15,
wherein performing the kernel selection procedure comprises:
generating the set of nonlinear kernel candidates;
selecting a first kernel of the set of nonlinear candidate kernels based at least in part on a first kernel vector associated with the first kernel corresponding to a first maximum correlation with the second signal, wherein the first maximum correlation comprises a greatest correlation value from a set of correlation values corresponding to the set of candidate kernels;
generating a second kernel vector corresponding to a second kernel of the set of nonlinear candidate kernels;
generating an orthonormalized kernel vector by orthonormalizing the second kernel vector with the first kernel vector; and
selecting the second kernel based at least in part on the orthonormalized kernel vector corresponding to a second maximum correlation with the second signal, wherein the second maximum correlation comprises a greatest correlation value from a subset of candidate kernels of the set of candidate kernels, wherein the subset of candidate kernels excludes the first kernel.

24. The method of claim 15, further comprising
performing, based at least in part on a set of self-interference cancellation (SIC) resources, at least one of an updated kernel selection procedure or an updated coefficient estimation procedure.

25. The method of claim 24,
wherein the set of SIC resources corresponds to a transmission pause associated with at least one other network node.

26. The method of claim 15,
wherein performing the coefficient estimation procedure comprises transmitting a self-interference reference signal, wherein estimating the set of coefficients comprises estimating the set of coefficients based at least in part on the self-interference reference signal.

27. The method of claim 15,
wherein performing the coefficient estimation procedure comprises performing at least one of a least square procedure or a recursive least square procedure.

28. The method of claim 15, further comprising
configuring at least one of the set of nonlinear candidate kernels, a quantity of kernels in the subset of kernels, or a length of a reference signal.

* * * * *